US008467041B2

(12) United States Patent
Dinjian et al.

(10) Patent No.: US 8,467,041 B2
(45) Date of Patent: Jun. 18, 2013

(54) FIBER OPTIC PORT SIGNATURE APPLICATOR

(76) Inventors: Mark A. Dinjian, Reading, MA (US); William S. Heinstrom, Litchfield, NH (US)

( * ) Notice: Subject to any disclaimer, the term of this patent is extended or adjusted under 35 U.S.C. 154(b) by 278 days.

(21) Appl. No.: 12/957,493

(22) Filed: Dec. 1, 2010

(65) Prior Publication Data

US 2012/0140207 A1     Jun. 7, 2012

(51) Int. Cl.
  *G01N 21/00*     (2006.01)
(52) U.S. Cl.
  USPC .......................................... 356/73.1
(58) Field of Classification Search
  USPC .......................................... 356/73.1
  See application file for complete search history.

(56) References Cited

U.S. PATENT DOCUMENTS

| 3,884,585 A | | 5/1975 | Lebduska | |
|---|---|---|---|---|
| 4,883,054 A | * | 11/1989 | Fuller et al. | 606/12 |
| 5,196,899 A | | 3/1993 | Serwatka | |
| 5,396,569 A | * | 3/1995 | Yanagawa et al. | 385/24 |
| 6,094,261 A | | 7/2000 | Contarino | |
| 6,628,885 B1 | | 9/2003 | Wilkie et al. | |
| 2007/0014526 A1 | | 1/2007 | Lazo | |

FOREIGN PATENT DOCUMENTS

WO         0563467         10/1993

\* cited by examiner

*Primary Examiner* — Tu Nguyen
(74) *Attorney, Agent, or Firm* — Occhiuti Rohlicek & Tsao LLP

(57) ABSTRACT

An apparatus for illuminating optical fibers, said apparatus includes a housing having a face; fiber ports disposed on said face, each of said fiber ports being configured to engage a connector on an optical fiber; port lamps, each being disposed to provide light through a corresponding one of said fiber ports; and a control system configured to cause said port lamps to provide light according to corresponding port signatures, said port signatures being distinct from each other.

19 Claims, 5 Drawing Sheets

FIG. 3

FIBER OPTIC PORT SIGNATURE APPLICATOR

BACKGROUND

In many communication systems, bundles of optical fibers extend significant distances between two points. In many office buildings, these bundles of fibers terminate in a wiring closet. In a typical wiring closet, there may be hundreds of optical fibers. Upon leaving the wiring closet, these fibers diverge along different paths, extending through ceilings and walls to various other termination points in different parts of the building. In some cases, fibers that begin in a wiring closet extend to neighboring buildings.

In many cases, the fibers appear identical to each other. Accordingly, it is often difficult for maintenance personnel to determine which of the many wires in a closet is the one that extends to a particular location. To address this difficulty, one typically shines a light through individual fibers and visually inspects the other ends of the fibers.

Occasionally, a few optical fibers will break, or otherwise lose continuity. Proper maintenance of such communication systems typically include identifying broken fibers.

One way to identify broken fibers is to shine a light at a first end and look at a second end to see if a light exits out the other end. However, this procedure is carried out one fiber at a time, and is therefore time consuming.

Another option is to shine a light through the first end of each of several fibers at the same time. However, even if one were to identify a fiber having a dark second end, it would not be possible to easily determine which fiber's first end the dark second end would correspond to.

SUMMARY

In one aspect, the invention features an apparatus for illuminating optical fibers. Such an apparatus includes a housing having a face; fiber ports disposed on the face, each of the fiber ports being configured to engage a connector on an optical fiber; port lamps, each being disposed to provide light through a corresponding one of the fiber ports; and a control system configured to cause the port lamps to provide light according to corresponding port signatures, the port signatures being distinct from each other.

Embodiments of the above apparatus include those in which port signatures comprise different colors, those in which port signatures comprise different rhythmic patterns, and those in which comprise different combinations of rhythmic patterns and colors.

Other embodiments of the above apparatus include those in which the plurality of port lamps comprises at least one LED port lamp, those in which the plurality of port lamps comprises at least one diode laser, and those in which the plurality of port lamps comprises at least one incandescent lamp.

Some embodiments also include a lens in optical communication with a port lamp from the plurality of port lamps, whereas others include a color filter in optical communication with a port lamp from the plurality of port lamps.

In some embodiments, the control system includes a first controller programmed to cause a first subset of the plurality of port lamps to blink according to a first rhythmic pattern, and a second controller programmed to cause a second subset of the plurality of port lamps to blink according to a second rhythmic pattern that differs from the first rhythmic pattern.

A variety of dispositions are also possible for the fiber ports. For example, in some embodiments, the fiber ports are disposed in an array that has two or more portions, each portion being associated with a different rhythmic pattern, so that each fiber port associated with a particular one of the plurality of portions has a port signature with the same rhythmic pattern. In other embodiments, the fiber ports are disposed in an array having two or more portions, each of which is associated with a different color, in which case each fiber port associated with a particular one of the plurality of portions has a port signature with the same color. In still other embodiments, the fiber ports are disposed in an array of rows and columns, with each fiber port in a particular column associated with a port signature having the same color, and in which each fiber port associated with a particular row has a port signature with the same rhythmic pattern.

In another aspect, the invention features an apparatus for passing light through each of a plurality of optical fibers. Such an apparatus includes a plurality of means for receiving an optical fiber; means for providing light to a first means for receiving an optical fiber; means for providing light to a second means for receiving an optical fiber; means for causing the means for providing light to a first means for receiving an optical fiber to cause the light to be provided according to a first port signature; and means for causing the means for providing light to a second means for receiving an optical fiber to cause the light to be provided according to a second port signature.

In some embodiments, the means for causing the means for providing light to a first means for receiving an optical fiber to cause the light to be provided according to a first port signature comprises means for providing light having a first color, and the means for causing the means for providing light to a second means for receiving an optical fiber to cause the light to be provided according to a second port signature comprises means for providing light having a second color that differs from the first color.

In other embodiments, the means for causing the means for providing light to a first means for receiving an optical fiber to cause the light to be provided according to a first port signature comprises means for providing light having a first rhythmic pattern, and the means for causing the means for providing light to a second means for receiving an optical fiber to cause the light to be provided according to a second port signature comprises means for providing light having a second rhythmic pattern that differs from the first rhythmic pattern.

In yet other embodiments, the means for causing the means for providing light to a first means for receiving an optical fiber to cause the light to be provided according to a first port signature comprises means for providing light having a first combination of a rhythmic pattern and a color, and the means for causing the means for providing light to a second means for receiving an optical fiber to cause the light to be provided according to a second port signature comprises means for providing light having a second combination of a rhythmic pattern and a color, the second combination being different from the first combination.

In yet another aspect, the invention features a method for testing a plurality of optical fibers. Such a method includes causing light having different port signatures to enter corresponding first ends of different optical fibers; and comparing port signatures of light received at the second ends of the different optical fibers.

Some practices of the method also include identifying a break in one of the first and second optical fibers at least in part on the basis of the comparison.

Other practices of the method also include, determining, based at least in part on the inspection, mapping each of the second ends to a corresponding first end.

DESCRIPTION OF THE FIGURES

FIG. 3 shows the front face of the apparatus of FIG. 1;

DETAILED DESCRIPTION

Figure 1:
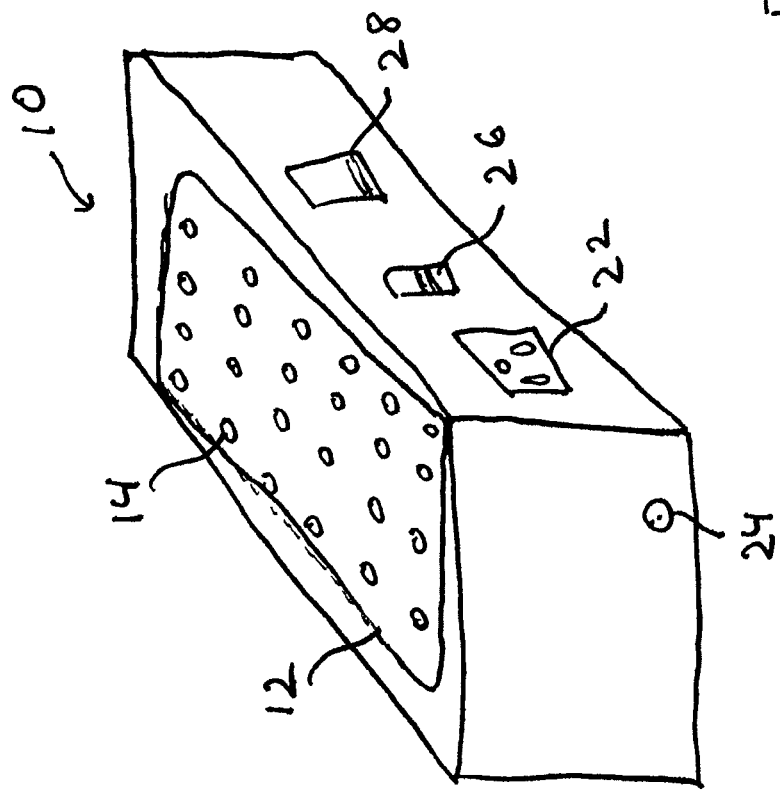
FIG. 1 is a perspective view of the apparatus described herein.

An apparatus 10 for testing continuity of optical fibers, as shown in FIG. 1, includes an array 12 of fiber ports 14 for receiving corresponding optical connectors or couplers at first ends of corresponding optical fibers. The fiber ports 14 are configured to accept one or more fiber-optic couplers, such as ST, SC, FC, FDDI (FDS) and ESCON (RSD).

Figure 2:
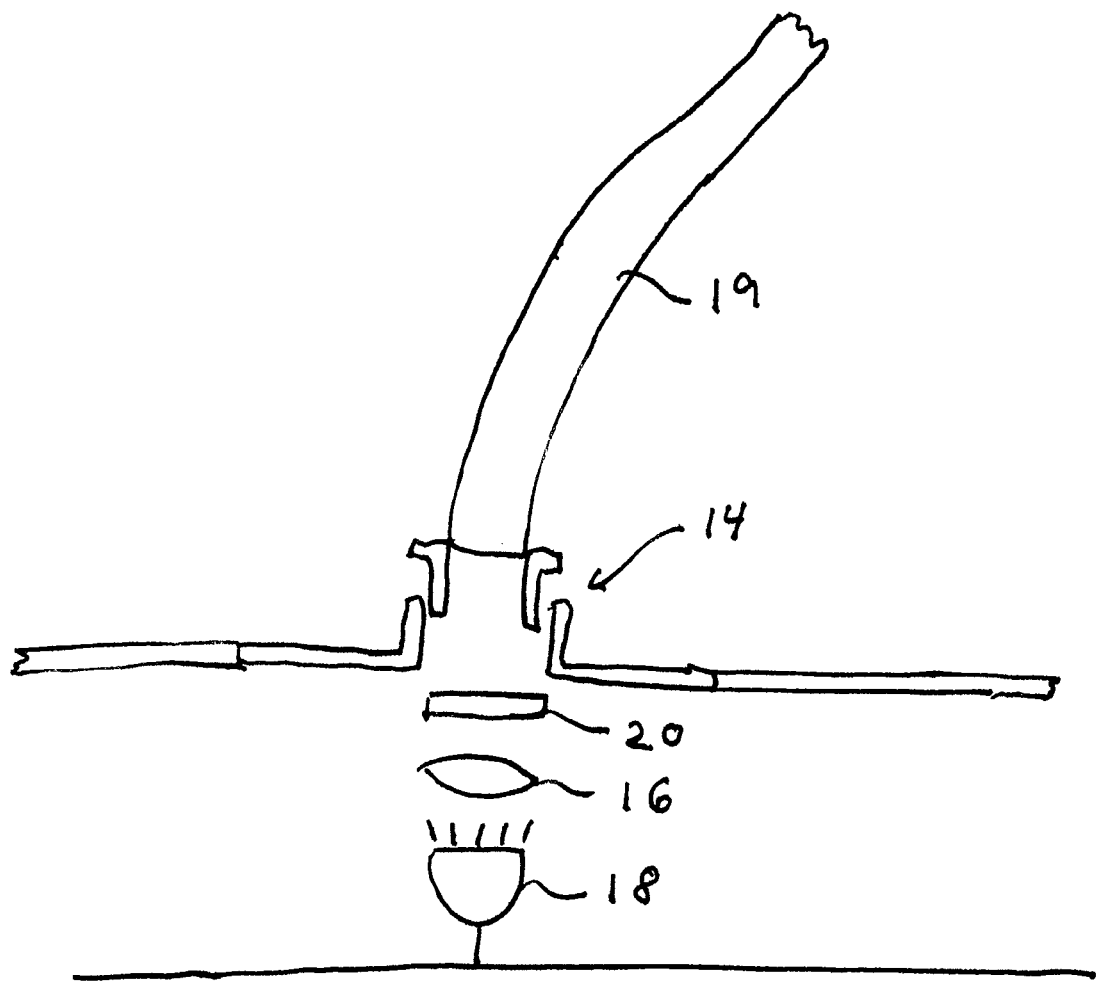
FIG. 2 shows a cross section of a fiber port from the apparatus of claim 1.

As shown in FIG. 2, each fiber port 14 has an associated port lamp 18 for providing light that is ultimately placed on an optical fiber 19. In some embodiments, the port lamps are LEDs. An LED port lamp is particularly useful because an LED can be pulsed with little loss of intensity, is available in a variety of colors, consumes little power, and provides an intense and relatively collimated beam. In addition, LEDs can turn on and off quickly.

For particularly long optical fibers, in which long range light transmission is advantageous, a semiconductor diode laser makes a useful port lamp 18. In addition, a high intensity light bulb can be used as a port lamp 18.

In some embodiments, the fiber port 14 can include a lens 16 for directing the light into a relatively narrow beam to be placed on the fiber.

To provide suitable colors, some embodiments use port lamps 18 having the desired colors. However, in other embodiments, a filter 20 is provided in series with the port lamp 18 to remove all but the desired wavelengths of light.

Referring back to FIG. 1, the apparatus 10 further includes a power input 22 for receiving AC power. Alternative embodiments rely on battery power, in which case a charger input 24 can be provided. In such embodiments, the battery is a long-lasting 9-volt NiCad battery. However, conventional household batteries, such as AAA, AA, C, and D batteries can be used.

A first switch 26 connects the light sources to a power supply. A suitable switch 26 is a slide switch such as the SS039-P023BA switch manufactured by T-MEC in Taiwan.

A second switch 28 causes the light source to operate in steady mode or in pulsed mode. In steady mode, the port lamps 18 burn steadily. In pulsed mode, the port lamps 18 flash according to a predetermined rhythm.

Figure 3:
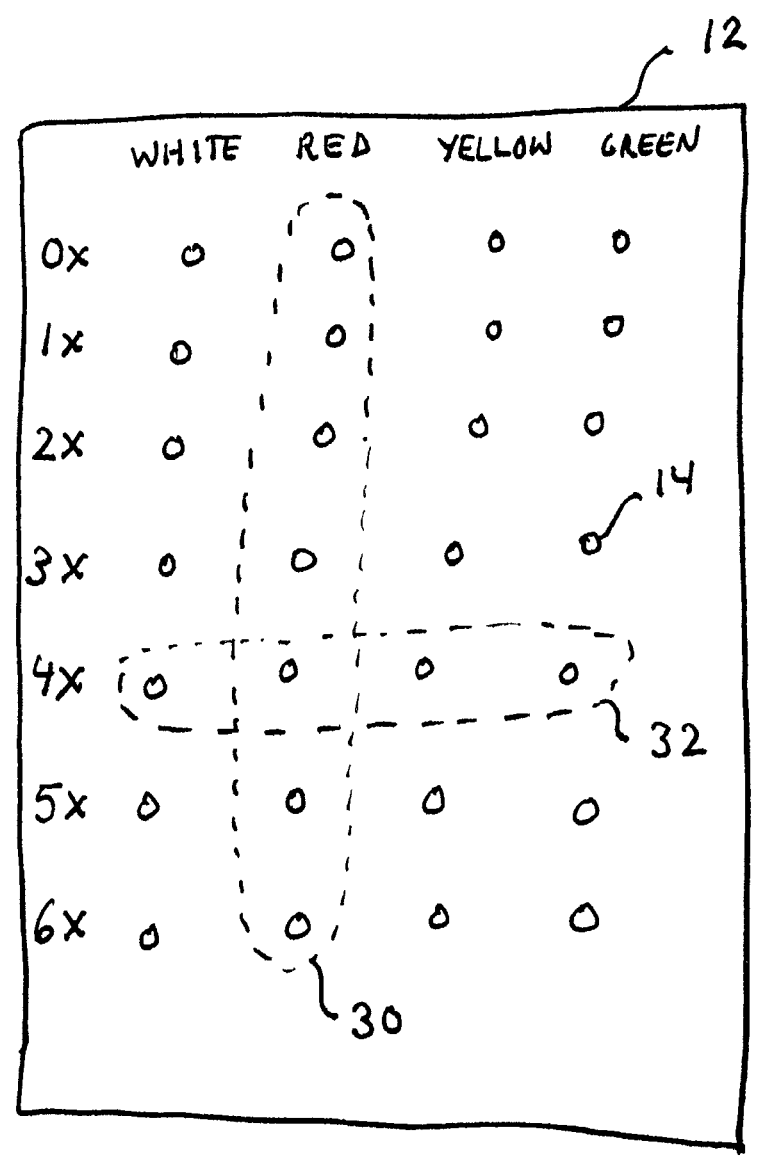

As shown in FIG. 3, each column 30 of the array 12 of fiber ports 14 is associated with a color and each row 32 is associated with a particular rhythmic pattern. In the illustrated embodiment, there are four colors: white, red, yellow, and green, and seven distinct rhythmic patterns, ranging from a constant light in the first row, a blinking light in the first row, a twice blinking light in the third row, and so on. The particular combination of a rhythmic pattern and a color defines a port signature associated with a fiber port 14. As a result, when the apparatus 10 is powered on, it is a straightforward matter to identify each fiber port 14 by its port signature.

Figure 4:
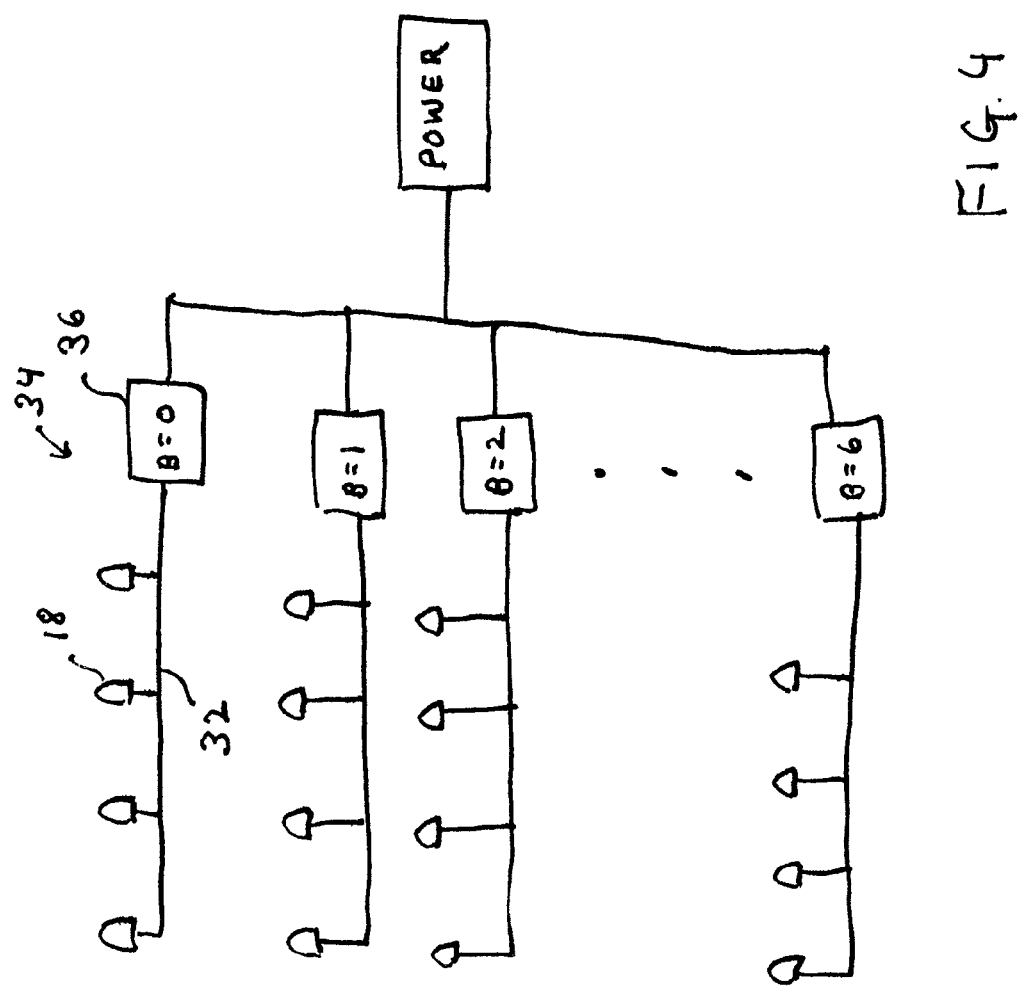
FIG. 4 shows a circuit for controlling the operation of the apparatus of FIG. 1.

Referring now to FIG. 4, a control system 34 for controlling the port lamps 18 features plurality of programmable timers 36, each of which has been preset to implement a particular rhythmic pattern. Each timer 36 controls all port lamps 18 that are in a particular timer 36 in FIG. 2. A suitable timer 36 is the 555 Timer, first introduced by Signetics Corporation in 1971, but now available from a variety of manufacturers as an integrated circuit.

In operation, one attaches, to each fiber port 14, a first end of an optical fiber 19. Then, one turns on the port lamps 18. Because each port lamp 18 displays a unique combination of color and rhythmic pattern, one can inspect the second ends of each fiber and identify which second end corresponds to which first end. This greatly facilitates, for example, identifying a fiber with a discontinuity, or determining the second end of a fiber that corresponds to a particular first end.

Figure 5:
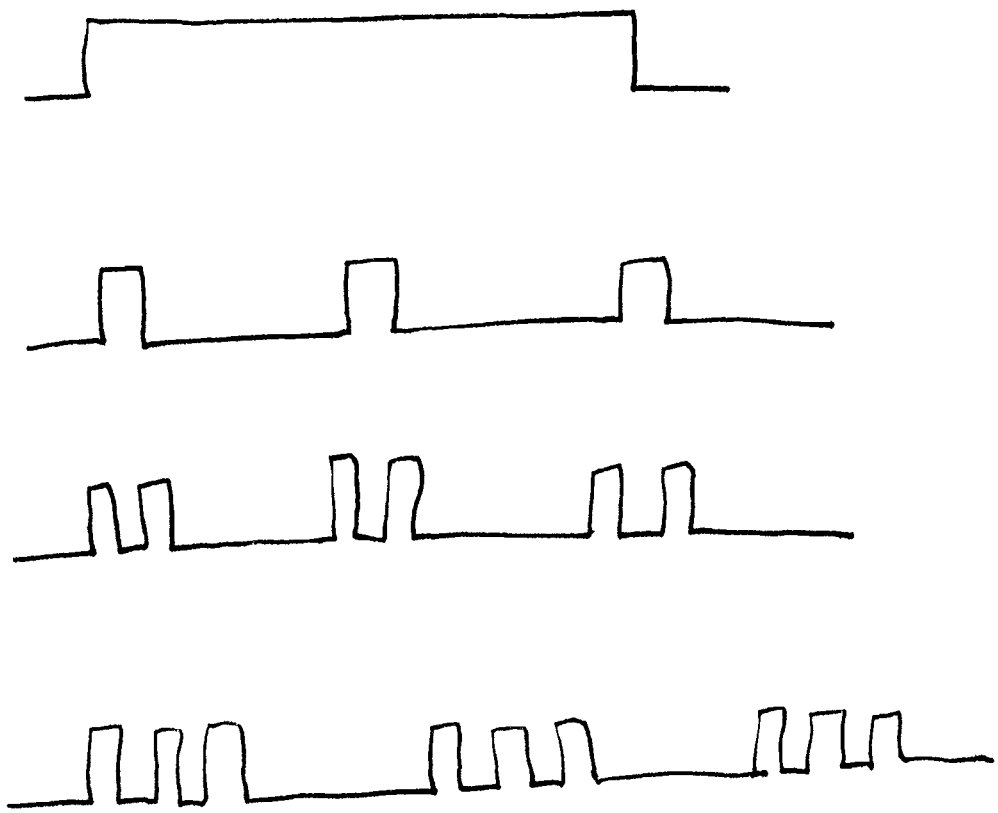
FIG. 5 shows exemplary port signatures.

A variety of rhythmic patterns can be used as a port signature or a part thereof. In one embodiment, the rhythmic pattern includes having a port lamp 18 turn on and off a predetermined number of times with a 50% duty cycle at a flashing frequency of 3-5 Hz. This is followed by an intermission, during which the port lamp 18 does not flash, followed by a repeat of the same rhythmic pattern. FIG. 5 shows exemplary port signatures distinguished from each other by different numbers of pulses.

The use of different rhythmic patterns significantly increases the number of possible port signatures, and hence the number of fibers that can be examined in parallel. In an embodiment that relies on different colors, one quickly exhausts the number of different colors that can reliably be distinguished by the human eye. In contrast, there is considerably more variety in rhythmic patterns. Although one embodiment features rhythmic patterns of equal length flashes, there is no reason the rhythmic pattern could not consist of long and short flashes, or combinations of shorter and longer gaps between flashes.

In another embodiment, the port lamp 18 may be configured to flash two or more colors in sequence. This embodiment creates additional combinations that allow more complex display characteristics for each fiber port 14.

In general, the embodiments described herein have in common the ability to associate a particular port signature with each fiber port 14. The port signature can be a color, a rhythmic pattern, of any combination thereof. Using the port signature, it is possible to identify, by inspecting the light at a second end of a fiber far away from the apparatus 10, which second ends are associated with which first ends, thus greatly simplifying maintenance of fiber optic communication systems.

Having described the invention, and a preferred embodiment thereof, what we claim as new and secured by letters patent is:

1. An apparatus for illuminating optical fibers, said apparatus comprising: a housing having a face; fiber ports disposed on said face, each of said fiber ports being configured to engage a connector on an optical fiber; port lamps, each being disposed to provide light through a corresponding one of said fiber ports; and a control system configured to cause said port lamps to provide light according to corresponding port signatures, said port signatures being distinct from each other, wherein said control system comprises a first controller programmed to cause a first subset of said plurality of port lamps to blink according to a first rhythmic pattern, and a second controller programmed to cause a second subset of said plurality of port lamps to blink according to a second rhythmic pattern that differs from said first rhythmic pattern.

2. The apparatus of claim 1, where said port signatures comprise different colors.

3. The apparatus of claim 1, wherein said port signatures comprise different rhythmic patterns.

4. The apparatus of claim 1, wherein said port signatures comprise different combinations of rhythmic patterns and colors.

5. The apparatus of claim 1, wherein said plurality of port lamps comprises an LED port lamp.

6. The apparatus of claim 1, wherein said plurality of port lamps comprises a diode laser.

7. The apparatus of claim 1, wherein said plurality of port lamps comprises an incandescent lamp.

8. The apparatus of claim 1, further comprising a lens in optical communication with a port lamp from said plurality of port lamps.

9. The apparatus of claim 1, further comprising a color filter in optical communication with a port lamp from said plurality of port lamps.

10. The apparatus of claim 1, wherein said fiber ports are disposed in an array, said array having a plurality of portions, each portion being associated with a different rhythmic pattern, wherein each fiber port associated with a particular one of said plurality of portions has a port signature with the same rhythmic pattern.

11. The apparatus of claim 1, wherein said fiber ports are disposed in an array, said array having a plurality of portions, each portion being associated with a different color, wherein each fiber port associated with a particular one of said plurality of portions has a port signature with the same color.

12. The apparatus of claim 1, wherein said fiber ports are disposed in an array of rows and columns, wherein each fiber port in a particular column has a port signature having the same color, and wherein each fiber port associated with a particular row has a port signature with the same rhythmic pattern.

13. An apparatus for passing light through each of a plurality of optical fibers, said apparatus comprising: a plurality of means for receiving an optical fiber; means for providing light to a first means for receiving an optical fiber; means for providing light to a second means for receiving an optical fiber; means for causing said means for providing light to a first means for receiving an optical fiber to cause said light to be provided according to a first port signature; and means for causing said means for providing light to a second means for receiving an optical fiber to cause said light to be provided according to a second port signature, wherein said means for causing said means for providing light to a first means for receiving an optical fiber to cause said light to be provided according to a first port signature comprises means for providing light having a first rhythmic pattern, and said means for causing said means for providing light to a second means for receiving an optical fiber to cause said light to be provided according to a second port signature comprises means for providing light having a second rhythmic pattern that differs from said first rhythmic pattern.

14. The apparatus of claim 13, wherein said means for causing said means for providing light to a first means for receiving an optical fiber to cause said light to be provided according to a first port signature comprises means for providing light having a first color, and said means for causing said means for providing light to a second means for receiving an optical fiber to cause said light to be provided according to a second port signature comprises means for providing light having a second color that differs from said first color.

15. The apparatus of claim 13, wherein said means for causing said means for providing light to a first means for receiving an optical fiber to cause said light to be provided according to a first port signature comprises means for providing light having a first combination of a rhythmic pattern and a color, and said means for causing said means for providing light to a second means for receiving an optical fiber to cause said light to be provided according to a second port signature comprises means for providing light having a second combination of a rhythmic pattern and a color, said second combination being different from said first combination.

16. An apparatus for passing light through each of a plurality of optical fibers, said apparatus comprising a plurality of means for receiving an optical fiber, means for providing light to a first means for receiving an optical fiber, means for providing light to a second means for receiving an optical fiber, means for causing said means for providing light to a first means for receiving an optical fiber to cause said light to be provided according to a first port signature, and means for causing said means for providing light to a second means for receiving an optical fiber to cause said light to be provided according to a second port signature, wherein said means for causing said means for providing light to a first means for receiving an optical fiber to cause said light to be provided according to a first port signature comprises means for providing light having a first combination of a rhythmic pattern and a color, and said means for causing said means for providing light to a second means for receiving an optical fiber to cause said light to be provided according to a second port signature comprises means for providing light having a second combination of a rhythmic pattern and a color, said second combination being different from said first combination.

17. An apparatus for illuminating optical fibers, said apparatus comprising a housing having a face, fiber ports disposed on said face, each of said fiber ports being configured to engage a connector on an optical fiber, port lamps, each being disposed to provide light through a corresponding one of said fiber ports, and a control system configured to cause said port lamps to provide light according to corresponding port signatures, said port signatures being distinct from each other, wherein said fiber ports are disposed in an array, said array having a plurality of portions, each portion being associated with a different rhythmic pattern, wherein each fiber port associated with a particular one of said plurality of portions has a port signature with the same rhythmic pattern.

18. The apparatus of claim 17, where said port signatures comprise different colors.

19. An apparatus for illuminating optical fibers, said apparatus comprising a housing having a face, fiber ports disposed on said face, each of said fiber ports being configured to engage a connector on an optical fiber, port lamps, each being disposed to provide light through a corresponding one of said fiber ports, and a control system configured to cause said port lamps to provide light according to corresponding port signatures, said port signatures being distinct from each other, wherein said fiber ports are disposed in an array of rows and columns, wherein each fiber port in a particular column has a port signature having the same color, and wherein each fiber port associated with a particular row has a port signature with the same rhythmic pattern.

\* \* \* \* \*